United States Patent
El-Nakhily et al.

(10) Patent No.: US 8,301,690 B2
(45) Date of Patent: Oct. 30, 2012

(54) CORRELATOR SYSTEM FOR WEB SERVICES

(75) Inventors: Ahmed El-Nakhily, Cairo (EG); Ehab Elkersh, Alexandria (EG)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 12/367,070

(22) Filed: Feb. 6, 2009

(65) Prior Publication Data

US 2010/0205237 A1 Aug. 12, 2010

(51) Int. Cl.
*G06F 15/16* (2006.01)

(52) U.S. Cl. ........ 709/203; 709/217; 709/218; 709/219; 709/226; 709/227; 709/228; 709/229

(58) Field of Classification Search .......... 709/203, 709/217–219, 226–229
See application file for complete search history.

(56) References Cited

U.S. PATENT DOCUMENTS

| | | | |
|---|---|---|---|
| 6,591,261 B1* | 7/2003 | Arthurs | 1/1 |
| 6,957,199 B1* | 10/2005 | Fisher | 705/78 |
| 7,124,062 B2* | 10/2006 | Gebhart | 702/186 |
| 7,440,940 B2* | 10/2008 | Chen et al. | 1/1 |
| 7,475,145 B2* | 1/2009 | Blizniak et al. | 709/227 |
| 7,493,302 B2* | 2/2009 | Emuchay et al. | 1/1 |
| 7,647,329 B1* | 1/2010 | Fischman et al. | 707/999.1 |
| 7,725,482 B2* | 5/2010 | Smith et al. | 707/759 |
| 7,739,281 B2* | 6/2010 | Najork | 707/735 |
| 2003/0084177 A1* | 5/2003 | Mulligan | 709/230 |
| 2004/0030674 A1* | 2/2004 | Nagano et al. | 707/1 |
| 2004/0143623 A1* | 7/2004 | Fukui et al. | 709/200 |
| 2005/0027871 A1* | 2/2005 | Bradley et al. | 709/227 |
| 2005/0149294 A1* | 7/2005 | Gebhart | 702/186 |
| 2006/0041669 A1* | 2/2006 | Bemmel et al. | 709/229 |
| 2006/0149756 A1* | 7/2006 | Walker | 707/100 |
| 2007/0011126 A1* | 1/2007 | Conner et al. | 706/47 |
| 2007/0180115 A1* | 8/2007 | Bahrs et al. | 709/226 |
| 2007/0283034 A1* | 12/2007 | Clarke et al. | 709/231 |
| 2008/0069124 A1* | 3/2008 | Patrick | 370/401 |
| 2008/0077709 A1* | 3/2008 | Zhuang | 709/246 |
| 2008/0263212 A1* | 10/2008 | Goix et al. | 709/228 |
| 2008/0294716 A1* | 11/2008 | Couvreur | 709/203 |

(Continued)

FOREIGN PATENT DOCUMENTS

EP 1735947 B1 6/2008

OTHER PUBLICATIONS

Xiaoling Wang, Kun Yue, Joshua Zhexue Huang, Aoying Zhou, "Service Selection in Dynamic Demand-Driven Web Services," i IEEE International Conference on Web Services (ICWS'04), Jul. 6-9, 2004, pp. 376-383.

(Continued)

*Primary Examiner* — Alina N. Boutah
(74) *Attorney, Agent, or Firm* — Kenneth L. Sherman, Esq.; Michael Zarrabian, Esq.; Sherman & Zarrabian LLP (57) ABSTRACT

A web service is correlated. One implementation involves correlating requests for Web services in an information technology network by automatically correlating a request to a Web service by: searching in said network for Web services that can satisfy the request, selecting among the Web services a Web service satisfying the request and providing the selected Web service in response to the request.

18 Claims, 6 Drawing Sheets

U.S. PATENT DOCUMENTS

| | | | |
|---|---|---|---|
| 2009/0031279 A1* | 1/2009 | Budinsky et al. | 717/104 |
| 2009/0055366 A1* | 2/2009 | Smith et al. | 707/4 |
| 2009/0055410 A1* | 2/2009 | Colgrave et al. | 707/100 |
| 2009/0083239 A1* | 3/2009 | Colgrave et al. | 707/4 |
| 2009/0158393 A1* | 6/2009 | Monjas Llorente et al. | 726/3 |
| 2009/0254906 A1* | 10/2009 | Zhang et al. | 718/101 |
| 2010/0049628 A1* | 2/2010 | Mannava et al. | 705/27 |
| 2010/0100525 A1* | 4/2010 | Huang | 707/609 |
| 2010/0131412 A1* | 5/2010 | Bradley et al. | 705/59 |
| 2010/0205015 A1* | 8/2010 | McGiffin et al. | 705/4 |

OTHER PUBLICATIONS

Eun-Kyu Byun and Jin-Soo Kim, "DynaGrid: A dynamic service deployment and resource migration framework for WSRF-compliant applications," Parallel Computing, vol. 33, Issues 4-5, May 2007, pp. 328-338.

Patten et al., "Build Flexible ESB Mediations with WebSphere Message Broker and WebSphere Service Registry and Repository," DeveloperWorks article Oct. 18, 2006, 13 pages, downloaded at http://www.ibm.com/developerworks/websphere/library/techarticles/0610_patten/0610_patten.html, on Dec. 12, 2008.

Portier et al., "Introduction to Service Data Objects: Next-generation data programming in the Java environment," DeveloperWorks article Sep. 28 2004, 19 pages, downloaded at http://www.ibm.com/developerworks/java/library/j-sdo/, on Dec. 1, 2008.

Barber, "Service Data Objects Home," Open SOA Collaboration, Nov. 7, 2007, 3 pages, downloaded http://www.osoa.org/display/Main/Service+Data+Objects+Home on Dec. 1, 2008.

* cited by examiner

CORRELATOR SYSTEM FOR WEB SERVICES

BACKGROUND

The present invention relates generally to information technology (IT) services and, more particularly, to Web services.

In information technology (IT) services such as Internet Web services, typically a user utilizing a Web browser, knows the provider Web service interface but is unaware of the number of Web services involved in implementing that interface. Further, the user is unaware of the location of the Web services or which service can serve the user request. Web services are software services (i.e., services provided by a software module). The most prominent approach for managing Web services utilizes a Universal Description, Discovery and Integration (UDDI) based registry. UDDI is a standard for publishing and locating information about Web services, using an information framework for description and classification of information such as Web services, and interfaces for the Web services.

BRIEF SUMMARY

Conventional Web service registries can be used to determine the number and location of Web services involved in a Web service interface implementation. However, such registries do not provide information about which Web service can serve the user request best. Such registries simply provide information such as "all implementations can serve your request". However, this is not accurate and, in reality, the selection responsibility is with the user in determining which Web service implemented can best serve the user request for service. The user must engage in UDDI programming to fetch the information about all such Web service implementations to determine the appropriate one.

A correlator for Web services is provided. One embodiment involves receiving a request for a Web service and automatically correlating a request to a Web service by: searching in an information technology network for Web services that can satisfy the request, selecting among the Web services a Web service satisfying the request and providing the selected Web service in response to the request.

The information technology network may comprise the Internet. Receiving a request for a Web service may further include receiving a Service Data Object (SDO) encapsulating service request information from a browser; searching for Web services further includes: based on the service information searching for Web services to satisfy the service request by querying each Web service to determine if it can satisfy the request; and selecting among the Web services further includes: selecting among the Web services using the service information to provide a Web service best suited for satisfying the request.

In another embodiment, a registry is maintained for one or more service records, wherein each service record registers a service interface and name for an associated Web service. Each service interface includes a filter function for determining if the associated Web service can satisfy a request. Receiving a request for a Web service further includes: receiving a service interface name for the interface of the service of interest and receiving a Service Data Object (SDO) encapsulating service request information. Searching for Web services that can satisfy the service request further includes: querying each service interface filter function to determine if the associated Web service can satisfy the request.

Correlating the request to a Web service is performed in a Universal Description Discovery and Integration (UDDI) registry implementation. Each provider of a Web service implements said filter function for the service interface associated with the Web service, and a Universal Description Discovery and Integration (UDDI) registry implements querying each service interface filter function to determine if the associated Web service can satisfy the request, and selecting among the Web services a Web service satisfying the request.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for information technology (IT) Web services. While the following description will be described in terms of Web services for clarity and placing the invention in context, it should be kept in mind that the teachings herein may have broad application to all types of systems, devices and applications.

In one embodiment, the invention provides a correlator system that relieves the consumer from Universal Description, Discovery and Integration (UDDI) programming to fetch the information about all Web service implementations to then determine the appropriate Web service for a user request. The correlator system places responsibility for fetching such information on the registry and the Web service providers.

The correlator system includes a filter module and a request correlator module. These modules can comprise software modules including program instructions for execution by one or more processors or computing devices. In one implementation of the correlator system, each Web service provider implements the filter module configured to check the user request data to judge if the request can be processed by that Web service or not. The UDDI registry implements the request correlator module configured to receive a service request from the user, find the Web service providers that match the requested interface and utilize the filter module of each matching Web service provider to select a Web service provider best suited to service the user request. A translator service implementation is the service provider for English-to-French translation.

Figure 1:
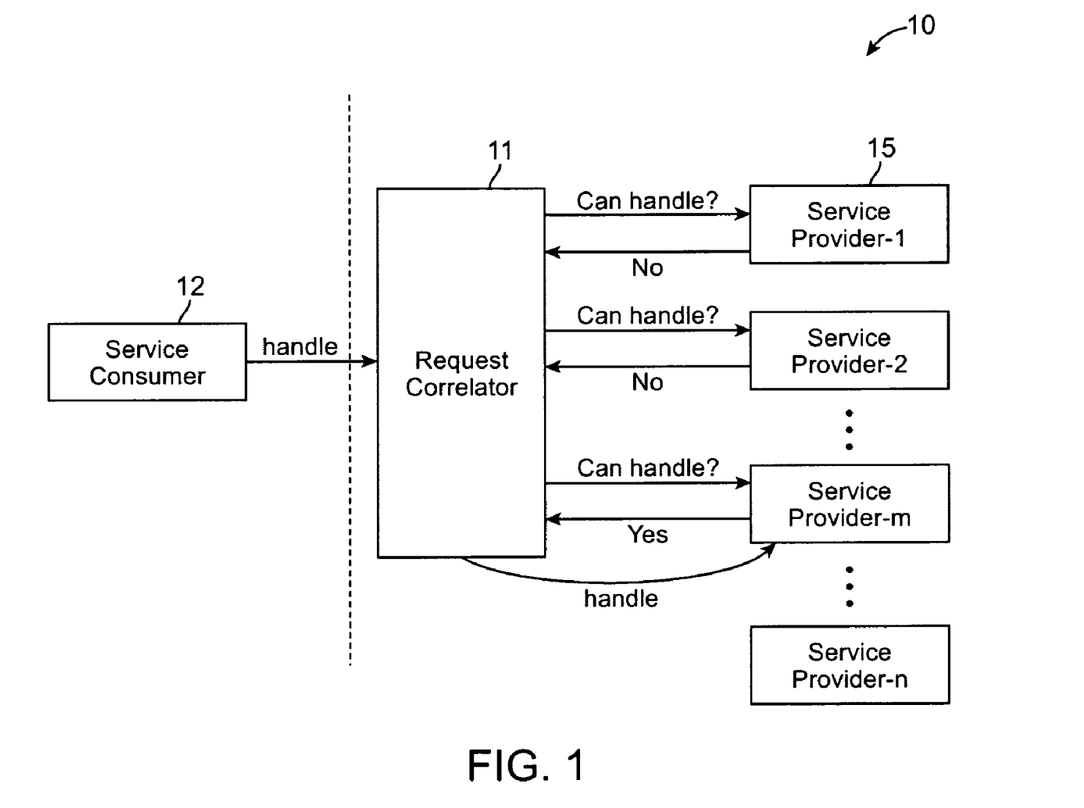
FIG. 1 illustrates a functional block diagram of a system for correlating requests to Web services.

FIG. 1 shows a functional block diagram of an embodiment of the correlator system 10. A request correlator 11 provides application programming interfaces (APIs) for handling requests from a user (consumer) browser 12. The request correlator gathers service information, searches for Web services 15 to satisfy the request, selects among n Web services 15 that can handle the request, and returns a selected Web service that can best handle the request to the user 12. The service information may include user information and nature of service requested (e.g., text translation Web service, order processing Web service). A service consumer may be a web page, any type of application or any other service and service provider may provide its service over the internet, intranet or any network (LAN, WAN, or the internet).

Figure 2:
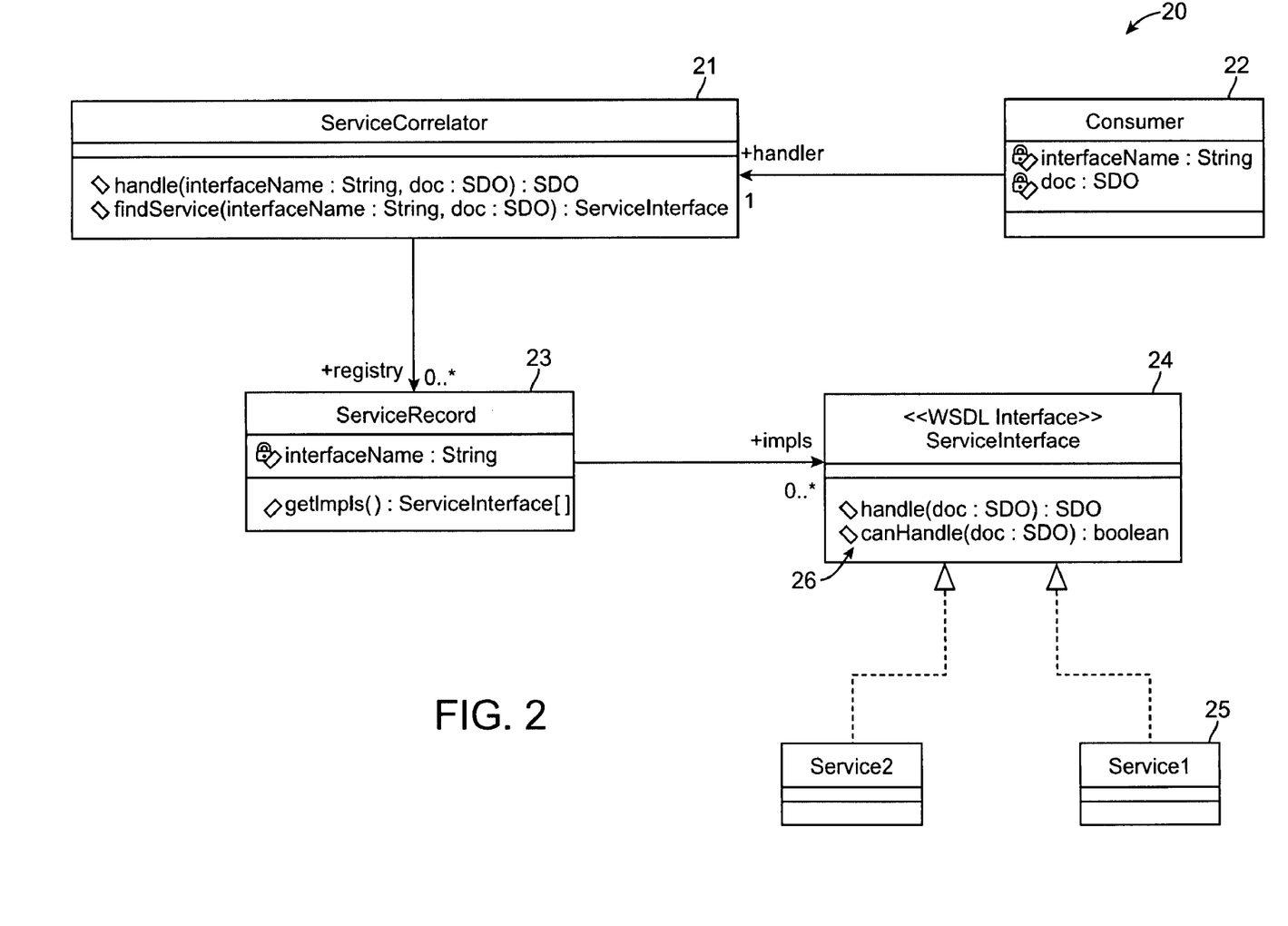
FIG. 2 illustrates a more detailed class diagram of a system for correlating requests to Web services, in an information technology (IT) environment.

FIG. 2 shows a class diagram of the correlator system 20, showing more details of the system. The request correlator is implemented as a Service Correlator software module 21 which provides application programming interfaces (APIs) for receiving user (e.g., consumer) requests and finding a Web service that can handle the request, and returning the Web service itself to the user 22. A registry 23 (e.g., UDDI registery) includes one or more Service Records in a storage device, wherein each Service Record registers one Service Interface 24 with its identification (e.g., name). Each Web service 25 (e.g., Service1, Service2) implements a Web Service Interface 24 for a Web service. A filter module implemented as a canHandle function 26 in each Service Interface 24 allows filtering the user requests to determine only those requests the Service Interface can handle. Each Service Interface is queried to determine if the associated Web service can satisfy the user request.

Figure 3:
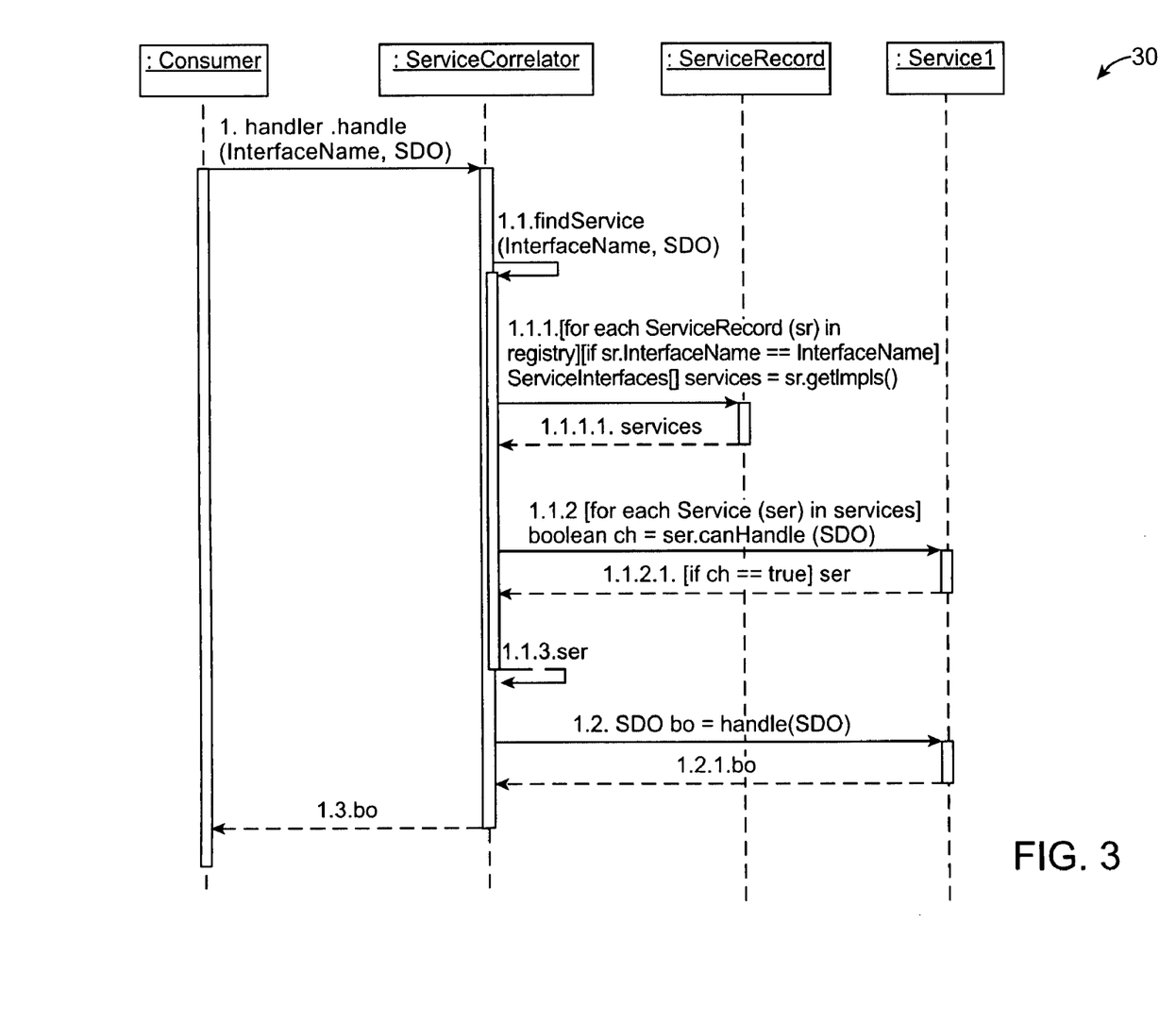
FIG. 3 illustrates a call sequence diagram for correlating requests to Web services, in an information technology (IT) environment.

FIG. 3 shows an example correlation process 30 implemented by the correlator system 20. Initially the service consumer desires a service to serve a request (e.g., a Web service providing a software module that translates English language text to French language text), but does not know a concrete Web service that can perform the desired service. In step 1, the Consumer browser calls the Service Correlator "handle" methods (or in step 1.1 may call "findService" methods). The Consumer browser provides as call parameters: the service InterfaceName which is the name of the interface of the service that the consumer is interested in, and a Service Data Object (SDO) which is a business object that encapsulates the request data. SDO is a framework for data application development, which includes an architecture and API, known to those skilled in the relevant art.

In steps 1.1.1 and 1.1.1.1, the Service Correlator iterates on the registry ServiceRecords searching for the registration entry for the provided InterfaceName. When the registry entry of said Interface Name is found, in steps 1.1.2, 1.1.2.1 and 1.1.3, the Service Correlator obtains all concrete Web service implementations of the interface associated with said Interface Name, and iterates on them asking each Web service whether it "canHandle" the request based on the provided request data in the SDO. When a Web service answers positively, in steps 1.2, 1.2.1 and 1.3, the ServiceCorrelator returns that Web service to the Consumer as a selected Web service. In one example, the best Web service may be the first service that can handle the request. Other ways of selecting a best Web service may also be used.

Specifically, when a Web service answers positively, the Service Correlator returns it to the Consumer in case the "findService" is the originally called method, or the Service Correlator calls the Services' "handle" method providing it the SDO and receiving the resulting SDO then returning it to the consumer in case the "handle" method is the called method. The sequence describes one scenario which is calling "handle".

Figure 4:
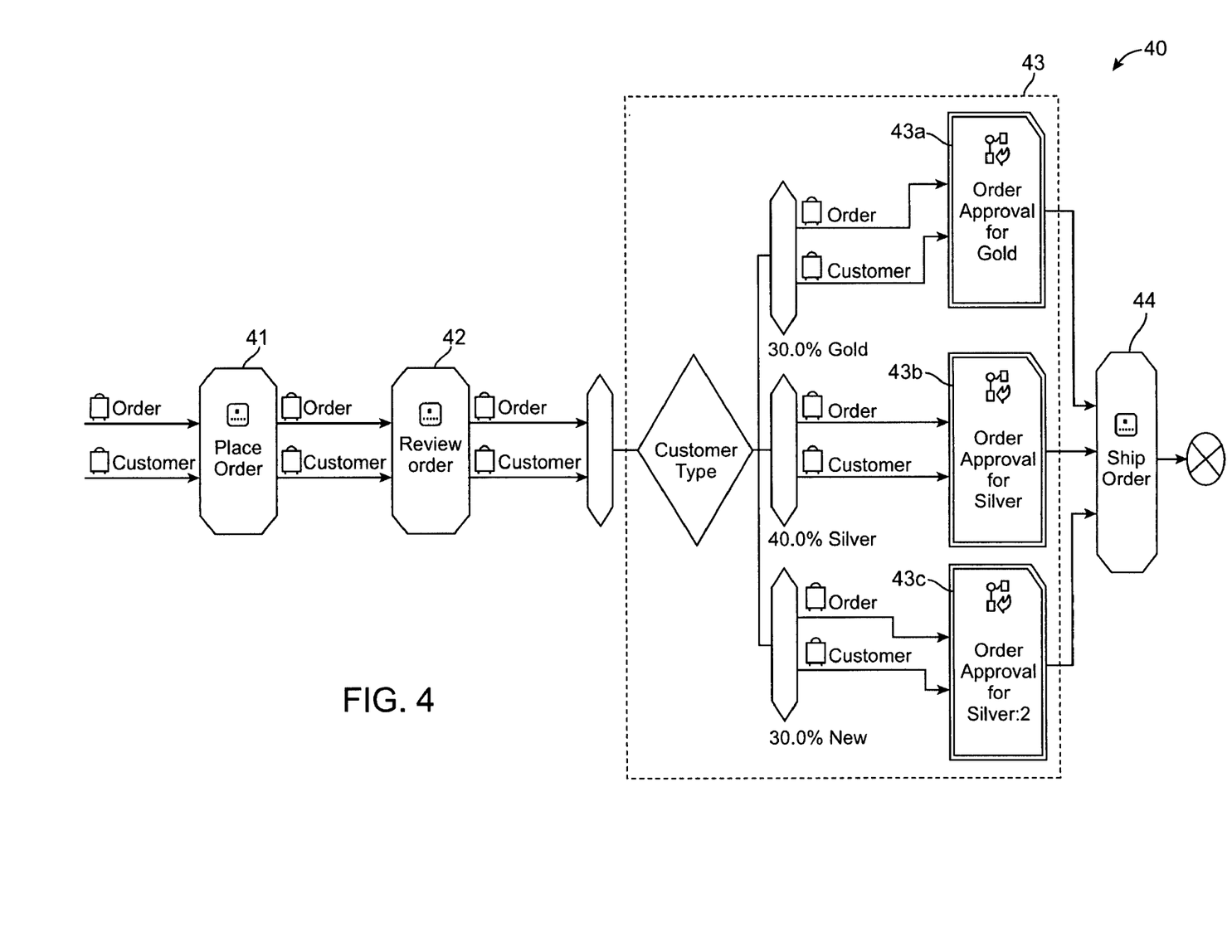
FIGS. 4 and 5 illustrate an example correlating requests to Web services, in a business process arena, in an information technology (IT) environment.
Figure 5:
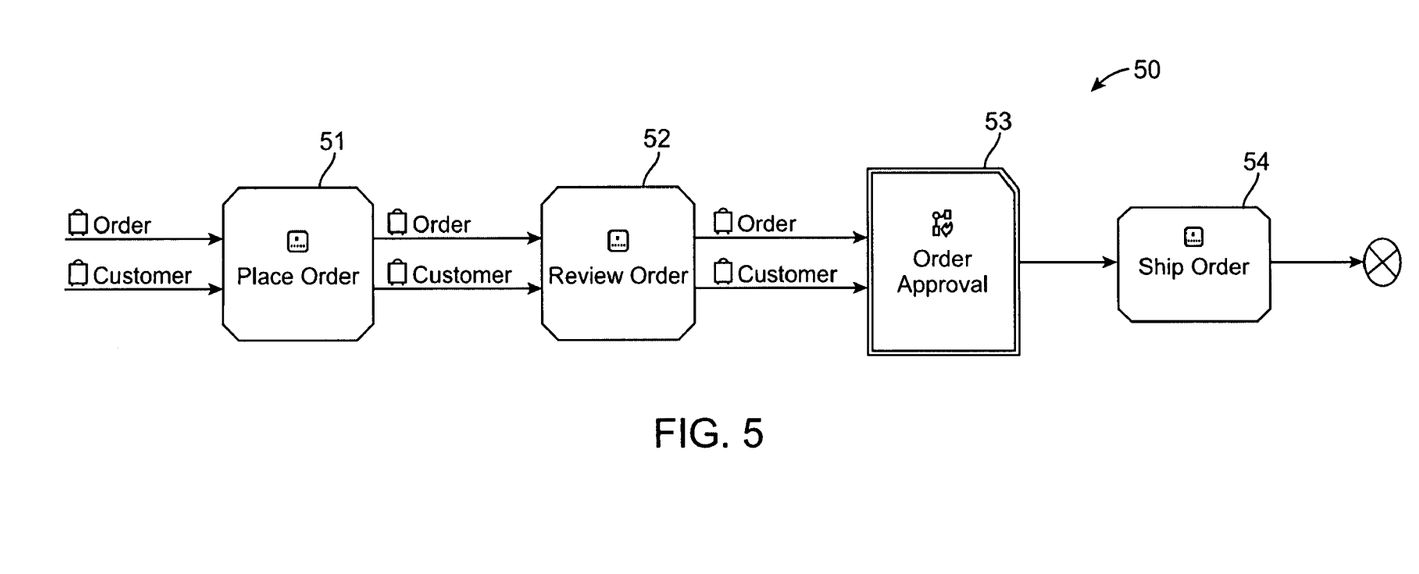

FIGS. 4-5 show an example operation scenario utilizing the Web service correlator process of system 20, for automated order processing by a Web server. FIG. 4 shows order processing including modules: Place Order 41, Review Order 42, Order Approval 43, and Ship Order 44. Each of the modules 41, 42, 43, and 44 has a Service Interface (i.e., Place Order interface, Review Order interface, Approval interface, Ship Order interface, respectively). The customer information is sent by a Web browser to the Web server, along with the order information. The customer can be of three types: Gold, Silver or New. The approval step differs based on consumer type.

When the service correlator process is not used, as shown by process 40 in FIG. 4, the ordering process involves three different approval sub-processes 43a, 43b, and 43c, for the three customer types, although all three sub-processes take the same input and have the same interface (e.g., Order Approval user interface). If the organization owning the order processing service Web server decides to add a fourth consumer type (e.g., "Diamond customer type), the order processing system requires an update (i.e., a fourth approval sub-process for the fourth customer type), and re-deployment of the entire order processing system (i.e., main process including modules 41, 42, 43, and 44) to handle that case.

FIG. 5 shows an example operation scenario 50 utilizing the Web service correlator process of system 20, for the automated order processing by a Web server. The order processing including modules: Place Order 51, Review Order 52, Order Approval 53, and Ship order 54. The binding for order approval takes place at runtime without explicit coding at design time. Simply, one interface (i.e., Order Approval) is registered in a Service Record (FIG. 2) in the registry and the three different implementations 43a, 43b, and 43c in FIG. 4 are deployed and implement the method "canHandle" differently. At runtime, according to the sent customer information, the Service Correlator selects the appropriate Web service for Order Approval according to process 30 in FIG. 3. With this late binding, more customer types can be added and more approval sub-processes can be deployed and invoked accordingly, at the right time, without any change in the model or re-deploying for the main process. This provides business polymorphism, enhancing business agility and managing change and time-to-market. The invention does not require a developer of model 43 to keep track of different service updates to accordingly update module 43 and deploy it.

The correlator system is further useful in Service Oriented Architecture (SOA) processed, Business Process Execution Language (BPEL) processes, etc. The correlator system takes dynamic decisions out of the process itself and provides the capability to dynamically plug-in services in an SOA solution or a BPEL process. Decisions are dynamic because, when any service (used by the process) is changed, being able/unable to handle the process request, will be reflected automatically on the process logic, without need to redevelop any part of the process (i.e., the process behavior is dynamically changed).

Figure 6:
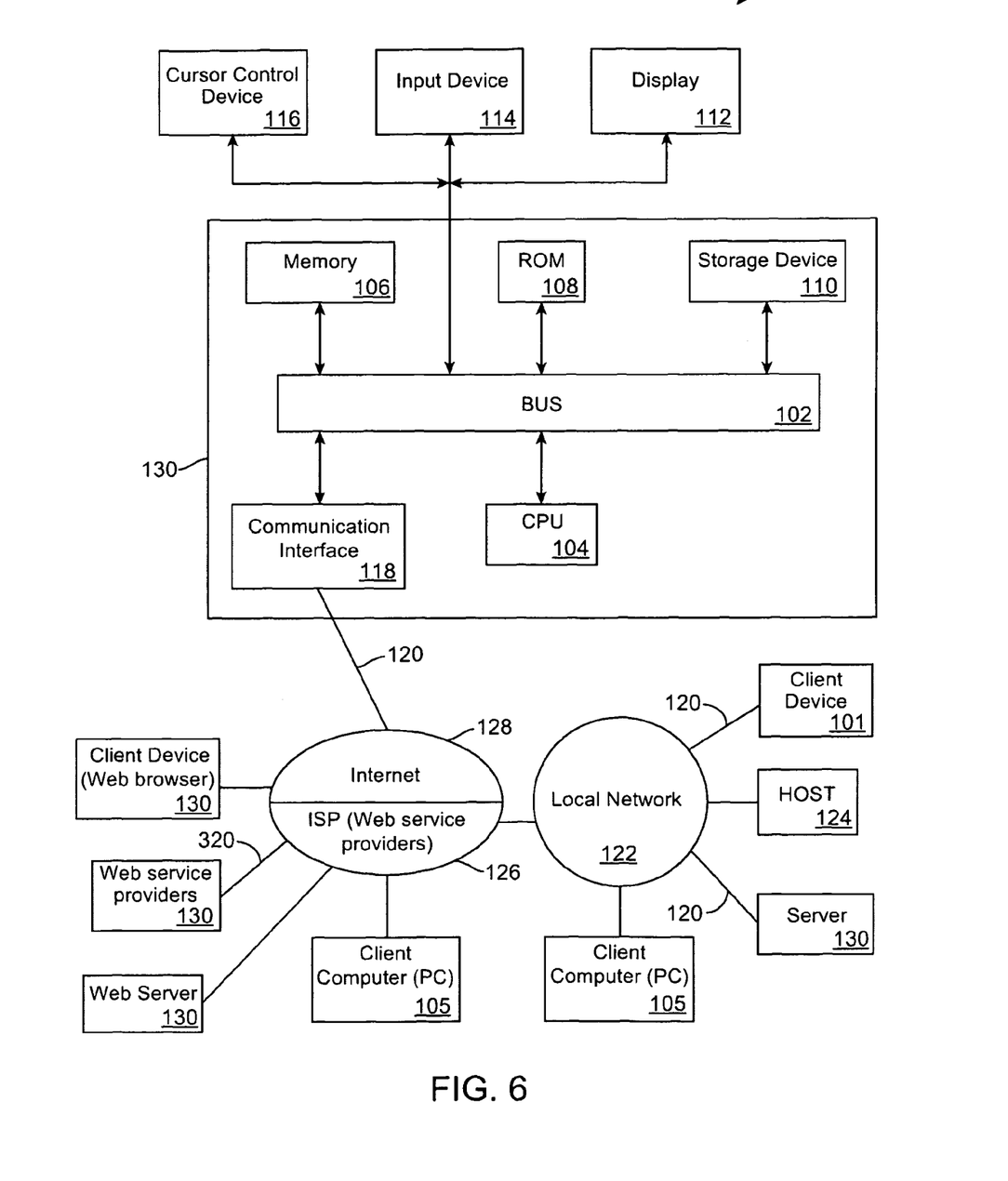
FIG. 6 illustrates an example computing system for implementing an embodiment of the invention.

FIG. 6 shows a block diagram of an example architecture of an embodiment of a system 100 for implementing an embodiment of the invention. The system 100 includes one or more client devices 101 connected to one or more server computing systems 130. A server 130 includes a bus 102 or other communication mechanisms for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled, via the bus 102, to a display 112 for displaying information to a computer user. An input device 114, including alphanumeric and other keys, is coupled to the bus 102 for communicating information and command selections to the processor 104. Another type of user input device comprises cursor control 116, such as a mouse, a trackball or cursor direction keys for communicating direction information and command selections to the processor 104, and for controlling cursor movement on the display 112.

According to one embodiment of the invention, the functions of the system 10 (FIG. 1) are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Generally, the term "computer-readable medium", as used herein, refers to any medium that participated in providing instructions to the processor 104 for execution. Such a medium may take many forms, including but not limited to, non-volatile media, volatile media and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126, in turn, provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120, and the communication interface 118. Further, the communication interface 118 can comprise of a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and, as interconnected machine modules, within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device, and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to, firmware, resident software, microcode, etc. Furthermore, the embodiments of the invention can take the form of a computer program product accessible from a computer-usable or computer-readable medium providing program code for use by, or in connection with, a computer, processing device or any instruction execution system. For the purposes of this description, a computer-usable or computer readable medium can be any apparatus that can contain, store, communicate, or transport the program for use by, or in connection with, the instruction execution system, apparatus or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for correlating requests for Web services in an information technology network, comprising:
   receiving a request for a Web service including an object encapsulating service request information, wherein the object comprises a Service Data Object (SDO) that is received from a browser, and each Web service is associated with a Web service provider;
   automatically correlating the request to a Web service by: searching in said network for Web services that can satisfy the request based on the service request information by sending a query including the service request information to each Web service provider to determine if its Web service can satisfy the request, and selecting among the Web services a Web service best suited for satisfying the request; and
   providing the selected Web service in response to the request.

2. The method of claim 1 further comprising:
   maintaining a registry for a service record;
   wherein said service record registers a service interface and a service interface name for an associated Web service.

3. The method of claim 2 wherein each service interface comprises a filter function for determining if the associated Web service can satisfy a request, the filter function implemented by a Web service provider of the associated Web service.

4. The method of claim 3 wherein:
   receiving a request for a Web service further comprises:
      receiving a service interface name for the interface of a service of interest, and receiving an SDO encapsulating service request information; and
      searching for Web services that can satisfy the service request further comprises: querying each service interface filter function to determine if the associated Web service can satisfy the request.

5. The method of claim 4 wherein correlating the request to a Web service further comprises: utilizing a Universal Description Discovery and Integration (UDDI) registry for querying each service interface filter function to determine if the associated Web service can satisfy the request.

6. The method of claim 5 wherein correlating the request to a Web service further comprises: utilizing said Universal Description Discovery and Integration (UDDI) registry for querying a service interface filter function of each Web service provider to determine if the associated Web service can satisfy the request, and selecting among the Web services a Web service satisfying the request.

7. The method of claim 4 wherein searching for Web services that can satisfy the service request further comprises:
   finding a service record in the registry with a service interface name matching the received service interface name;
   obtaining implementations of a service interface of the found service record; and
   for each obtained implementation, utilizing said obtained implementation to send a query including the service request information to a Web service provider to determine if its Web service can satisfy the request.

8. A system for correlating requests for Web services in an information technology network, comprising:
   one or more Web services maintained in said network, wherein each Web service is associated with a Web service provider;
   a request correlator employing a hardware processor in a server, configured for receiving a request for a Web service including an object encapsulating service request information and automatically correlating the request to a Web service by: searching in said network for Web services that can satisfy the request based on the service request information by sending a query including the service request information to each Web service provider to determine if its Web service can satisfy the request, selecting among the Web services a Web service best suited for satisfying the request, and providing the selected Web service in response to the request,
   wherein the information technology network comprises the Internet, and the object comprises a Service Data Object (SDO) received from a browser.

9. The system of claim 8 further comprising:
   a service interface for each Web service; and
   a registry for a service record, wherein said service record registers a service interface and a service interface name for an associated Web service.

10. The system of claim 9 wherein each service interface comprises a filter function for determining if the associated Web service can satisfy a request, the filter function implemented by a Web service provider of the associated Web service.

11. The system of claim 10 wherein:
    the correlator is further configured for receiving a service interface name for the interface of the service of interest, receiving an SDO encapsulating service request information, and querying each service interface filter function to determine if the associated Web service can satisfy the request.

12. The system of claim 11 wherein the correlator is configured for correlating the request to a Web service utilizing a Universal Description Discovery and Integration (UDDI) registry for querying each service interface filter function to determine if the associated Web service can satisfy the request.

13. The system of claim 12 wherein correlating the request to a Web service further comprises: utilizing an Universal Description Discovery and Integration (UDDI) registry for querying a service interface filter function of each Web service provider to determine if the associated Web service can satisfy the request, and selecting among the Web services a Web service satisfying the request.

14. A non-transitory computer program product for correlating requests for Web services, said computer program product comprising:
    a computer usable medium having computer readable program code embodied therewith, wherein the computer readable program code when executed on a computer causes the computer to:
    receive a request for one or more Web services including an object encapsulating service request information, wherein the object comprises a Service Data Object (SDO) received form a browser, and each Web service is associated with a Web service provider;

automatically correlate the request to a Web service by: searching in an information technology network for Web services that can satisfy the request based on the service request information by sending a query including the service request information to each Web service provider to determine if its Web service can satisfy the request, and selecting among the Web services a Web service best suited for satisfying the request; and provide the selected Web service in response to the request.

15. The computer program product of claim 14 further comprising computer readable program code for:

maintaining a registry for one or more service records, wherein each service record registers a service interface and a service interface name for an associated Web service; and a filter function for each service interface to determine if the associated Web service can satisfy a request, the filter function implemented by a Web service provider of the associated Web service.

16. The computer program product of claim 15 further comprising computer readable program code for receiving a service interface name for the interface of the service of interest, receiving an SDO encapsulating service request information, and querying each service interface filter function to determine if the associated Web service can satisfy the request.

17. The computer program product of claim 16 further comprising computer readable program code utilizing a Universal Description Discovery and Integration (UDDI) registry for querying each service interface filter function to determine if the associated Web service can satisfy the request.

18. The computer program product of claim 17 further comprising computer readable program code utilizing an Universal Description Discovery and Integration (UDDI) registry for querying a service interface filter function of each Web service provider to determine if the associated Web service can satisfy the request, and selecting among the Web services a Web service satisfying the request.

* * * * *